United States Patent [19] [11] 3,955,212
Engel et al. [45] May 4, 1976

[54] CONSTANT BANDWIDTH RGB OUTPUT AMPLIFIERS HAVING SIMULTANEOUS GAIN AND DC OUTPUT VOLTAGE CONTROL

[75] Inventors: Christopher M. Engel, Franklin Park; George J. Tzakis, Chicago, both of Ill.

[73] Assignee: Zenith Radio Corporation, Chicago, Ill.

[22] Filed: Jan. 3, 1975

[21] Appl. No.: 538,632

[52] U.S. Cl. ................................................ 358/29
[51] Int. Cl.² .......................................... H04N 9/20
[58] Field of Search .................. 358/21, 28, 29, 40, 358/32, 39; 315/13 CG; 330/29, 20, 17, 32, 30 R; 307/264; 328/168

[56] References Cited
UNITED STATES PATENTS

| | | | |
|---|---|---|---|
| 3,499,104 | 3/1970 | Austin | 358/40 |
| 3,706,937 | 12/1972 | Hanna | 330/29 |
| 3,737,562 | 6/1973 | Matzek | 358/29 |
| 3,832,645 | 8/1974 | Greutman | 330/29 |

OTHER PUBLICATIONS
Todd, "FETs as Voltage–Variable Resistors", *Electronic Design*, Vol. 13, No. 19, Sept. 13, 1965, pp. 66–68.
McIntosh, "Variable Resistance FET Gives 75-db Gain Control", *Electronic Design*, Vol. 11, No. 18, Aug. 30, 1963, p. 56.
Towers, *Transistor Television Receivers*, John F. Rider, Publisher, New York, pp. 64–72.

*Primary Examiner*—Robert L. Griffin
*Assistant Examiner*—John C. Martin
*Attorney, Agent, or Firm*—Nicholas A. Camasto; Roy A. Ekstrand

[57] ABSTRACT

A color television receiver includes conventional circuitry for processing and detecting a received color television signal. Three chrominance-luminance matrices combine detected color difference and luminance signals forming color red, blue and green video signals. Emitter follower coupling stages apply the color video signals individually to each of three output amplifiers which in turn drive the cathode electrodes of a unitized gun CRT. Potentiometers couple the emitter electrodes of the output amplifiers to a source of operating potential providing a simultaneous signal gain and DC output voltage adjustment for each amplifier during CRT color temperature setup. A voltage divider controls the voltage applied to the common screen grid electrode of the CRT providing a master setup adjustment.

9 Claims, 1 Drawing Figure

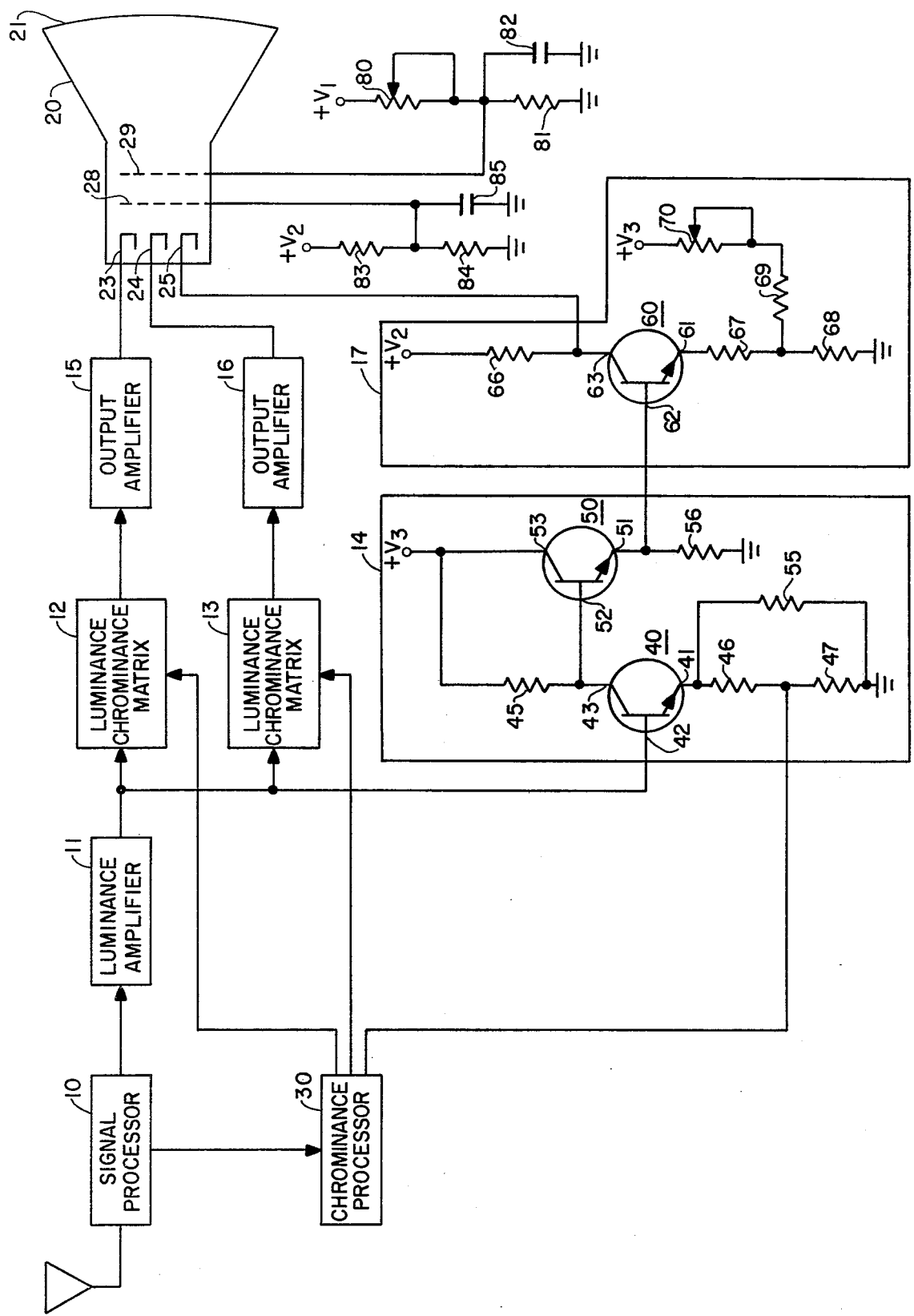

CONSTANT BANDWIDTH RGB OUTPUT AMPLIFIERS HAVING SIMULTANEOUS GAIN AND DC OUTPUT VOLTAGE CONTROL

BACKGROUND OF THE INVENTION

This invention relates to color television receivers and in particular to cathode ray tubes (CRT) drive systems therefor. Each of the several types of color television cathode ray tubes in current use includes a trio of individual electron sources producing distinct electron beams which are directed toward an image screen formed by areas of colored-light-emitting phosphors deposited on the inner surface of the CRT. The phosphors emit light of a given additive primary color (red, blue or green) when struck by high energy electrons. A "delta" electron gun arrangement, in which the electron sources comprise three electron guns disposed at the vertices of an equilateral triangle, having its base oriented in a horizontal plane and its apex above or below the base plane, may be used. Alternatively, the three electron sources may be "in line", that is, positioned in a horizontal line. In either case, the three beams produced are subjected to deflection fields and scan the image screen in both the horizontal and vertical directions thereby forming three substantially overlying rasters.

The phosphor deposits forming the image screen may alternatively comprise round dots, elongated areas, or uninterrupted vertical lines. A parallax barrier or shadow mask, defining apertures generally corresponding to the shape of the phosphor areas, is interposed between the electron guns and the image screen to "shadow" or block each phosphor area from electrons emitted from all but its corresponding electron gun.

A color television signal includes both luminance (monochrome) and chrominance (color) picture components. In the commonly used RGB drive systems the separately processed luminance and chrominance information is matrixed (or combined) before application to the CRT cathodes. Three output amplifiers apply the respective red, blue and green video signals thus produced for controlling the respective electron source currents.

The luminance components have substantially the same effect on all three electron sources whereas the color components are differential in nature, causing relative changes in electron source currents. In the absence of video signals, the combined raster should be a shade of grey. At high gun currents, the grey is very near white and at low settings, it is near black. The "color", commonly called color temperature, of the monochrome raster depends upon the relative contributions of red, blue and green light. At high color temperatures, the raster may appear blue and at low color temperatures it may appear sepia. While the most pleasing color temperature is largely a matter of design preference, ideally the receiver should not change color temperature under high and low brightness nor for high and low frequency picture information.

Generally, the electron sources comprise individual electron guns each including separately adjustable cathode, control grid and screen grid electrodes and a desired color temperature is achieved by adjustment of each electrode voltage during black and white setup. While the exact setup procedure employed varies with the manufacturer and specific CRT configuration, all manufacturers attempt to achieve consistent color temperature throughout the usable range of CRT beam current variations.

A typical color temperature adjustment involves setting the low light color temperature condition of each electron gun by adjusting its screen grid electrode voltage to produce the required DC conditions between electron guns at minimum beam currents. A high light or dive adjustment at increased CRT beam current is then made to insure consistent color temperature. In receivers utilizing CRT's with separately adjustable screen grid electrode voltages, the drive adjustment may take the form of a minor change in signal gain of the output amplifiers. The process is, in essence, one of configuring the operating points of the three electron guns to conform to three substantially identical output amplifiers.

The recently developed economical "unitized gun" type CRT has a combined electron source structure in which three common control grids and three common screen grids are used with the cathodes being the only electrically separate electrodes. The greatly simplified and more economical unitized gun structure, however, imposes some restrictions on the circuitry used to drive the electron sources. Perhaps most significant is the absence of the flexibility previously provided by individually adjustable screen grid electrode voltages. Due in part to the inverse relationship between electron source transconductance, which may be thought of as "gain" of the electron source, and cutoff voltage, the typical individual low level color temperature or equal cutoff adjustment described above also performs the additional function of establishing nearly equal transconductances for the three electron sources. As a result only minor relative changes in electron source currents occur at higher CRT beam currents.

Color temperature adjustment in a receiver with a unitized gun CRT involves a somewhat different process, namely, configuring the drive and bias applied to each of the gun cathodes to accommodate differences in relative electron source characteristics which, without the equalizing effect of separate screen electrode adjustments, may be considerable.

Initially television receivers using unitized gun CRT's utilized a variable DC voltage divider operative upon each output amplifier to provide adjustment of the DC cutoff voltage. Drive, or signal gain, adjustment to accommodate differences in electron source transconductances was generally accomplished by separate individual gain controls operative on each of the output amplifiers.

However, the more recently developed unitized gun systems combine the DC voltage (cutoff) and signal gain (drive) adjustments for each electron source by simultaneously varying the signal gain and DC voltage in the same direction in a predetermined relationship. One such system used three CRT coupling networks each of which includes a variable impedance simultaneously operative on both the amplitude of coupled signal and DC voltage. Another system uses a variable collector load impedance for each of the output amplifiers, making use of the changes in amplifier signal gain and DC output voltage resulting from collector load variations.

While such systems provide an adequate range of adjustment to achieve color temperature setup using a reduced number of controls, they often degrade image quality. Ideally, the luminance portion of the signal is applied uniformly to each of the three electron sources.

Although the relative signal amplitudes may be varied to accommodate transconductance differences between electron sources, it is desirable that each applied signal be an otherwise identical replica of the others. The variable impedance elements in the voltage divider networks and variable collector loads of the prior art interact with the capacities inherent in the output amplifiers and electron gun structures to produce unequal bandwidths for the different color video signals, which cause color changes in their high frequency components (which correspond to detailed picture information). The resulting effect upon the displayed image is similar in appearance to the well-known "color fringing" or misconvergence effect.

OBJECTS OF THE INVENTION

It is an object of the present invention to provide an improved color television receiver.

It is a further object of this invention to provide a novel CRT color temperature setup system.

SUMMARY OF THE INVENTION

In a color television receiver, for processing and displaying a received television signal bearing modulation components of picture information, a cathode ray tube includes three electron source means producing individual electron beams which impinge an image screen to form three substantially overlying images. The respective operating points and relative conduction levels of the electron source means determine the color temperature of the reproduced image. Master conduction means, coupled to the three electron source means, simultaneously vary the conduction levels and a plurality of substantially equal bandwidth amplifiers, each coupled to a different one of the electron source means, separately influence the conduction levels. Low output impedance signal translation means recover the picture information and supply it to each of the amplifiers. Separate adjusting means are individually coupled to at least two of the amplifiers for simultaneously producing predetermined variations in the gain and DC output voltage of the amplifiers while preserving the bandwidths.

BRIEF DESCRIPTION OF THE DRAWING

The drawing shows a partial-schematic, partial-block diagram representation of a color television receiver constructed in accordance with the present invention.

DESCRIPTION OF THE PREFERRED EMBODIMENT

Referring to the drawing, a signal processor 10 includes conventional circuitry (not shown) for amplifying a received television signal and detecting the modulated components of luminance and chrominance information therein. The output of signal processor 10 is coupled to a luminance amplifier 11 and a chrominance processor 30. Luminance amplifier 11 is conventional and includes circuitry controlling brightness and contrast of the luminance signal. The output of luminance amplifier 11 is coupled to three luminance-chrominance matrices 12, 13 and 14. Chrominance processor 30 includes conventional chrominance information detection circuitry for providing three color difference or color-minus-luminance output signals (R-Y, G-Y and B-Y) which are individually coupled to luminance-chrominance matrices 12, 13 and 14, respectively. The signal from luminance amplifier 11 is combined with the color-minus-luminance signals from chrominance processor 30 to form the respective red, green and blue video signals which are coupled to the R, G and B output amplifiers 15, 16 and 17, respectively. The outputs of amplifiers 15, 16 and 17 are coupled to the cathode electrodes 23, 24 and 25, respectively, of a CRT 20 having an image screen 21. A voltage divider, formed by a series combination of resistors 83 and 84, is coupled between a source of operating potential $+V_2$ and ground. The junction of resistors 83 and 84 is connected to a common control grid electrode 28 and to ground by a filter capacitor 85 which provides a signal bypass. A potentiometer 80 and a resistor 81 are series coupled between a source of operating potential $+V_1$ and ground, forming another voltage divider. The junction of potentiometer 80 and resistor 81 is connected to common screen grid electrode 29 and to ground by a bypass capacitor 82. Cathode electrodes 23–25, control grid electrode 28 and screen grid electrode 29 are part of a unitized gun structure in CRT 20 with the control grid and screen grid being common to each of the three electron sources defined by the separate cathode electrodes.

While luminance-chrominance matrices 12 and 13 are shown in block form, it should be understood that they are identical to the detailed structure of matrix 14. Similarly, red output amplifier 15 and green output amplifier 16 are identical to the detailed structure of blue output amplifier 17. Further, the receiver shown is understood to include conventional circuitry for horizontal and vertical electron beam deflection together with means deriving a CRT high voltage accelerating potential, all of which have, for clarity, been omitted from the drawing.

Luminance-chrominance matrix 14 includes a matrix transistor 40 having an emitter electrode 41 coupled to ground by a resistor 55 and by a series combination of resistors 46 and 47, a base electrode 42 coupled to the output of luminance amplifier 11, and a collector electrode 43 coupled to a source of operating potential $+V_3$ by a resistor 45. The B-Y output of chroma processor 30 is connected to the junction of resistors 46 and 47. An emitter-follower transistor 50 has an emitter electrode 51 coupled to ground by a resistor 56, a base electrode 52 connected to the collector of matrix transistor 40, and a collector electrode 53 connected to $+V_3$.

Blue amplifier 17 includes an output transistor 60 having an emitter electrode 61 coupled to ground by a series combination of resistors 67 and 68, a base electrode 62 connected to the emitter of transistor 50, and a collector electrode 63 coupled to $+V_2$ by a resistor 66. A series combination of a potentiometer 70 and a resistor 69 couples the junction of resistors 67 and 68 to $+V_3$. Collector 63, which is the output of amplifer 17, is connected to cathode 25 of CRT 20.

During signal reception, the separately processed luminance and B-Y color difference signals are applied to matrix transistor 40. The combined signal developed at its collector 43 forms the blue video signal which controls the blue electron beam in CRT 20 and represents the relative contribution of blue light in the image produced.

The blue video signal at collector 43 is coupled via transistor 50 to base 62 of output transistor 60. The low source impedance of emitter follower transistor 50 obviates any detrimental effects upon the blue video signal due to loading at the input to amplifier 17 caused by gain or frequency dependent input impedance variations of amplifier 17. The blue video signal applied to base 62 is amplified by transistor 60 to a level sufficient to control the conduction of its respective electron source.

During color temperature setup, a predetermined setup voltage (corresponding to black) is applied to matrices 12, 13 and 14. The voltage on common screen grid electrode 29 is adjusted, by varying potentiometer 80 which together with resistor 81 and capacitor 82 form master conduction means, to cause a low brightness raster to appear on image screen 21. As will be seen, adjustment of potentiometer 70 and the corresponding potentiometers in amplifiers 15 and 16 establish the correct combination of DC electron source cathode voltages and output amplifier gains to produce the selected color temperature at both low and high CRT beam currents.

Amplifier 17 includes a common emitter transistor stage in which the impedance coupled to emitter electrode 6 is a gain and DC output voltage determining impedance. Signal gain is approximately equal to the ratio of the collector impedance (resistor 66), to this gain and DC voltage determining impedance (ignoring the effects of capacities associated with the transistor and the electron gun which will be considered later). Because the source of operating potential $+V_3$ coupled to potentiometer 70 forms a good AC or signal ground, the series combination of resistor 69 and potentiometer 70 are effectively in parallel with resistor 68 and the total impedance coupling emitter 61 to signal ground comprises resistor 67 in series with this combination of resistors 68 and 69 and potentiometer 70. Variations in this impedance caused by adjustment of potentiometer 70 changes the ratio of collector to emitter impedances and thereby the gain of amplifier 17. If potentiometer 70 is varied to present increased resistance, gain is reduced and if varied to present decreased resistance, gain is increased.

The DC voltage at collector 63 of transistor 60 is determined by the product of the collector resistance and quiescent collector current (current in the absence of applied signal) and $V_2$. The voltage at base 62 is established by the emitter voltage of transistor 50. Variations in the resistance of potentiometer 70 cause variations in current flow in the series path including potentiometer 70 and resistors 69 and 68. The voltage developed across resistor 68 is supplied to emitter 61 through resistor 67.

In the absence of signal, the DC voltage at base 62 is constant and the relative voltage between base 62 and emitter 61, which controls the conduction level of transistor 60, is a function of the voltage at emitter 61. Increases in the resistance of potentiometer 70 reduce the emitter voltage, increase the relative base-emitter voltage of transistor 60, and increase collector current. The increased collector current develops a greater voltage drop across collector resistor 66 and reduces the DC voltage at collector 63 (and cathode 25). Conversely, a decrease in the resistance of potentiometer 70 increases the voltage at emitter 61, reducing the relative base-emitter voltage and decreasing collector current. The smaller voltage drop across resistor 66 increases the DC voltage at collector 63 and cathode 25.

Thus, increasing the resistance of potentiometer 70 produces proportionate simultaneous reduction of the DC voltage applied to cathode 25 and the voltage gain of amplifier 17, whereas decreasing the resistance of potentiometer 70 produces proportionate simultaneous increase of the DC voltage and signal gain. As mentioned above, amplifiers 15 and 16 are identical to amplifier 17. In practice only two of the three output amplifiers require adjustment to achieve color temperature setup. However, greater flexibility and optimum use of amplifier signal handling capability is realized if all three output amplifiers are adjustable.

As previously mentioned capacities associated with transistor 60, cathode 25 and corresponding interconnections (such as those used to couple collector 63 to cathode 25) are effectively in parallel with collector load resistor 66 forming a partially reactive "coupling network" which exhibits a frequency characteristic (bandwidth) affecting signals coupled therethrough. In practice, the other coupling networks have identical bandwidths and affect their signals in an equal manner. The setup control adjustments of the present invention do not change the characteristics of these coupling networks and the uniformity of signal coupling for the different color signals is preserved. In contrast, conventional adjustment circuitry (whether variable collector load or voltage divider) place variable impedances within these couplings. The varied adjustments of these impedances to effect color temperature control adjustment disturb the bandwidth characteristics of the coupling networks causing differential variations in the individual color video signals.

What has been shown is an RGB CRT drive system which includes output amplifiers each having a single control which simultaneously achieves changes of the DC output voltage and signal gain of the amplifier in a predetermined relationship. The bandwidths of all three output amplifiers and their associated coupling networks remain substantially undisturbed by these control adjustments during CRT color temperature setup.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a color televison receiver, for processing and displaying a received television signal bearing modulation components of picture information, having a cathode ray tube including a trio of electron source means producing individual electron beams impinging an image screen to form three substantially overlying images and in which the respective operating points and relative conduction levels of said electron source means determine the color temperature of the reproduced image, the combination comprising:

master conduction means, coupled to said trio of electron source means simultaneously varying said conduction levels;

a plurality of substantially equal bandwidth amplifiers, each coupled to a different one of said electron source means, separately influencing said conduction levels;

low output impedance signal translation means recovering said picture information and supplying it to each of said plurality of amplifiers; and separate adjusting means individually coupled to at least two of said amplifiers for simultaneously producing predetermined same sense variations in gain and DC output voltage of its associated amplifier while preserving said bandwidths.

2. The combination set forth in claim 1, wherein the transconductance and cutoff voltage of each of said electron source means bear a predetermined relationship and wherein said simultaneous predetermined variations in gain and DC output voltage are determined by said transconductance-cutoff voltage relationship.

3. The combination set forth in claim 2, wherein said plurality of amplifiers each include a gain and DC output voltage determining impedance and wherein each of said separate adjusting means include:
  a variable impedance, coupling said gain and DC output voltage determining impedance of said associated amplifier to a source of bias current and forming a shunt path for signals within said amplifier.

4. The combination set forth in claim 3, wherein each of said electron source means include a cathode electrode and wherein each of said amplifiers include:
  a transistor having input, common, and output electrodes, said output electrode being coupled to said electron source means cathode.

5. The combination set forth in claim 4, wherein said gain and DC output voltage determining impedance is coupled to said common electrode.

6. The combination set forth in claim 5, wherein said input, common, and output electrodes of said transistors are defined by base, emitter, and collector electrodes, respectively.

7. The combination set forth in claim 6, wherein said gain and DC output voltage determining impedance includes a resistor coupling said emitter electrode to ground and wherein said variable impedance includes:
  a resistive control, having a variable resistance, coupling said emitter electrode to a source of operating potential.

8. The combination set forth in claim 7, wherein said three electron source means include control grid and screen grid electrodes common to said three electron guns and wherein variations of cathode electrode voltages permit changes of said relative conduction levels and said respective operating points.

9. The combination set forth in claim 8, wherein said master conduction means includes a variable bias potential source coupled to said common screen grid electrode.

* * * * *